United States Patent
Al-Ansari et al.

(10) Patent No.: US 11,613,943 B2
(45) Date of Patent: Mar. 28, 2023

(54) SPENT VEHICLE TIRE LOST CIRCULATION MATERIAL (LCM)

(71) Applicant: Saudi Arabian Oil Company, Dhahran (SA)

(72) Inventors: Adel Al-Ansari, Dhahran (SA); Md Amanullah, Dhahran (SA); Bader Al-Zahrani, Dammam (SA); Turki Al-Subaie, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 44 days.

(21) Appl. No.: 17/212,730

(22) Filed: Mar. 25, 2021

(65) Prior Publication Data
US 2022/0307335 A1  Sep. 29, 2022

(51) Int. Cl.
| E21B 33/138 | (2006.01) |
| C09K 8/03 | (2006.01) |
| E21B 21/00 | (2006.01) |
| E21B 33/13 | (2006.01) |

(52) U.S. Cl.
CPC ............ *E21B 21/003* (2013.01); *E21B 33/13* (2013.01)

(58) Field of Classification Search
CPC ...... E21B 21/003; E21B 33/138; E21B 33/13; E21B 21/00; C09K 8/03
See application file for complete search history.

(56) References Cited

U.S. PATENT DOCUMENTS

| 4,116,288 A | 9/1978 | Love |
| 4,614,599 A * | 9/1986 | Walker .................... C09K 8/92 |
| | | 507/902 |
| 6,105,674 A * | 8/2000 | Liao ........................ C09K 8/508 |
| | | 166/295 |
| 7,066,285 B2 | 6/2006 | Shaarpour |
| 8,607,895 B2 | 12/2013 | Hoskins |
| 9,366,098 B2 | 6/2016 | Wu |
| 9,688,901 B2 | 6/2017 | Fontenot |
| 10,066,143 B2 | 9/2018 | Whitfill et al. |
| 10,240,411 B1 | 3/2019 | Amanullah |
| 10,494,884 B2 | 12/2019 | Amanullah et al. |
| 10,508,978 B2 | 12/2019 | Amanullah et al. |
| 10,724,327 B1 | 7/2020 | Alouhali et al. |

(Continued)

FOREIGN PATENT DOCUMENTS

| CN | 102191024 A | 9/2011 |
| CN | 102977870 A | 3/2013 |

(Continued)

OTHER PUBLICATIONS

Almagro, Santiago Pablo Baggini et al.; "Sealing Fractures: Advances in Lost Circulation Control Treatments" Oilfield Review, Autumn 2014; pp. 4-13.

(Continued)

*Primary Examiner* — Catherine Loikith
(74) *Attorney, Agent, or Firm* — Bracewell LLP; Constance G. Rhebergen; Brian H. Tompkins

(57) ABSTRACT

A lost circulation material (LCM) having flakes formed from waste vehicle tires. The LCM includes flakes produced from waste vehicle tires processed to remove steel components of the tires and produce flakes having a specific size. Also, methods of lost circulation control and manufacture of the waste vehicle tire LCM.

17 Claims, 2 Drawing Sheets

(56) References Cited

U.S. PATENT DOCUMENTS

| 10,767,095 | B2 | 9/2020 | Amanullah et al. |
| 2004/0129460 | A1 | 7/2004 | MacQuoid et al. |
| 2014/0038857 | A1 | 2/2014 | Miller et al. |
| 2016/0289528 | A1 | 10/2016 | Wagle et al. |
| 2018/0037803 | A1 | 2/2018 | Dahi Taleghani et al. |
| 2019/0249064 | A1 | 8/2019 | Amanullah et al. |
| 2020/0248060 | A1 | 8/2020 | Amanullah et al. |

FOREIGN PATENT DOCUMENTS

| CN | 104559973 A | 4/2015 |
| WO | 2010142370 A1 | 12/2010 |

OTHER PUBLICATIONS

Savari, Sharath et al.; "Resilient Lost Circulation Material (LCM): A Significant Factor in Effective Wellbore Strengthening" SPE 153154, SPE Deepwater Drilling and Completions Conference, Galveston, Texas, Jun. 20-21, 2012; pp. 1-7.

Wang, Gui et al.; "Experimental investigation on plugging behavior of granular lost circulation materials in fractured thief zone" Particulate Science and Technology an International Journal (2015); pp. 1-6.

\* cited by examiner

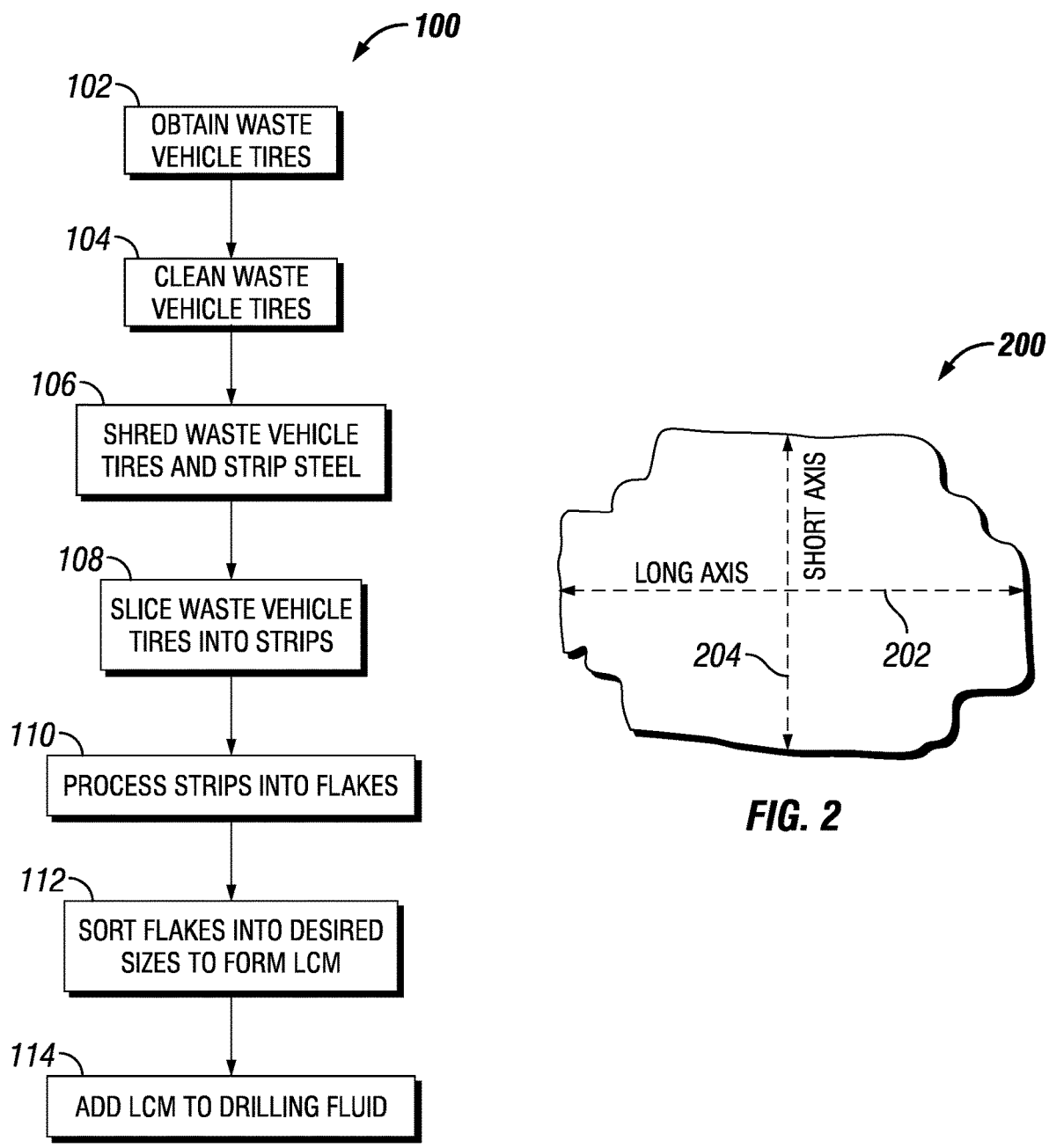

SPENT VEHICLE TIRE LOST CIRCULATION MATERIAL (LCM)

BACKGROUND

Field of the Disclosure

The present disclosure generally relates to controlling lost circulation in a wellbore during drilling with a drilling fluid. More specifically, embodiments of the disclosure relate to a lost circulation material (LCM) having flakes formed from spent vehicle tires.

Description of the Related Art

Lost circulation is one of the frequent challenges encountered during drilling operations. Lost circulation can be encountered during any stage of operations and occurs when drilling fluid (such as drilling mud) pumped into a well only partially returns or does not return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. Lost circulation problems may result in several days or weeks of non-productive time (NPT). In extreme cases, lost circulation problems may force abandonment of a well.

SUMMARY

LCMs used to combat lost circulation typically include particulate and fibrous LCMs. Most of these particulate and fibrous are non-resilient LCMs (that is, they are formed from materials that are not resilient). Additionally, LCMs may also include flake LCMs; however, such flake LCMs (for example, cellophane flakes) are non-resilient or have a very low resiliency.

Embodiments of the disclosure are directed to an LCM having flakes formed from spent vehicle tires. The flakes of the LCM may form a mat that is resilient under in-situ stresses and pressure conditions. The flakes of the LCM may further form adaptable seals and plugs in the highly permeable, fractured, and vugular formations to maintain seal and plug stability under the dynamic loading behavior of a wellbore environment. The resilient flakes of the LCM may improve the likelihood of a successful LCM treatment operation due to the adaptable seals and plugs formed by the LCM at the dynamic conditions.

In one embodiment, a method to prevent lost circulation of a drilling fluid in a wellbore is provided. The method includes introducing an altered drilling fluid into the wellbore such that the altered drilling fluid contacts the lost circulation zone and reduces a rate of lost circulation into the lost circulation zone, such that the altered drilling fluid includes a drilling fluid and a lost circulation material (LCM). The LCM includes a plurality of flakes produced from a vehicle tire.

In some embodiments, the altered drilling fluid consists of the drilling fluid and the LCM. In some embodiments, the LCM consists of the plurality of flakes produced from a vehicle tire. In some embodiments, the plurality of flakes produced from a vehicle tire comprises a plurality of untreated flakes. In some embodiments, each of the plurality of flakes has a long axis of 7 millimeter (mm) to 10 mm and a short axis of 5 mm to 7 mm. In some embodiments, each of the plurality of flakes has a thickness of 3 mm to 4 mm. In some embodiments, the plurality of flakes have a coefficient of resiliency of 0.49 to 0.53. In some embodiments, the LCM has a concentration of 10 pounds-per-barrel (ppb) to 50 ppb in the altered drilling fluid. In some embodiments, the flakes are produced by shredding the vehicle tire into a plurality of pieces, the shredding including removing steel from the vehicle tire, cutting each of the plurality of pieces into a plurality of strips, and cutting each of the plurality of strips into a plurality of flakes.

In another embodiment, an altered drilling fluid is provided. The altered drilling fluid includes a drilling fluid and a lost circulation material (LCM). The LCM includes a plurality of flakes produced a vehicle tire.

In some embodiments, the LCM consists of the plurality of flakes produced from vehicle tires. In some embodiments, the plurality of flakes produced from a vehicle tire comprises a plurality of untreated flakes. In some embodiments, each of the plurality of flakes has a long axis of 7 millimeter (mm) to 10 mm and a short axis of 5 mm to 7 mm. In some embodiments, each of the plurality of flakes has a thickness of 3 mm to 4 mm. In some embodiments, the plurality of flakes have a coefficient of resiliency of 0.49 to 0.53. In some embodiments, the LCM has a concentration of 10 pounds-per-barrel (ppb) to 50 ppb in the altered drilling fluid. In some embodiments, the flakes are produced by shredding the vehicle tire into a plurality of pieces, the shredding including removing steel from the vehicle tire, cutting each of the plurality of pieces into a plurality of strips, and cutting each of the plurality of strips into a plurality of flakes.

In another embodiment, a lost circulation material (LCM) is provided. The LCM includes a plurality of flakes produced from vehicle tires. In some embodiments, the LCM consists of the plurality of flakes produced from vehicle tires. In some embodiments, the plurality of flakes produced from a vehicle tire comprises a plurality of untreated flakes. In some embodiments, each of the plurality of flakes has a long axis of 7 millimeter (mm) to 10 mm and a short axis of 5 mm to 7 mm. In some embodiments, each of the plurality of flakes has a thickness of 3 mm to 4 mm. In some embodiments, the plurality of flakes have a coefficient of resiliency of 0.49 to 0.53. In some embodiments, the flakes are produced by shredding the vehicle tire into a plurality of pieces, the shredding including removing steel from the vehicle tire, cutting each of the plurality of pieces into a plurality of strips, and cutting each of the plurality of strips into a plurality of flakes.

In another embodiment, a method of manufacturing a lost circulation material (LCM) is provided. The method includes obtaining a vehicle tire and shredding the vehicle tire into a plurality of pieces, the shredding including removing steel from the vehicle tire, each of the plurality of pieces having a size of 50 mm to 75 mm. The method also includes cutting each of the plurality of pieces into a plurality of strips, each of the plurality of strips having a thickness off 3 mm to 4 mm and a width of 5 mm to 7 mm, and cutting each of the plurality of strips into a plurality of flakes, each of the plurality of flakes having a long axis of 7 millimeter (mm) to 10 mm and a short axis of 5 mm to 7 mm. In some embodiments, the method includes cleaning the vehicle tire using an air jet before shredding the vehicle tire.

BRIEF DESCRIPTION OF THE DRAWINGS

FIG. 1 is flowchart of a process for the production and use of a LCM having flakes formed from waste vehicle tires in accordance with an embodiment of the disclosure.

FIG. 2 is a two-dimensional depiction of an example flake formed from waste vehicle tires in accordance with an embodiment of the disclosure.

DETAILED DESCRIPTION

Figure 3:
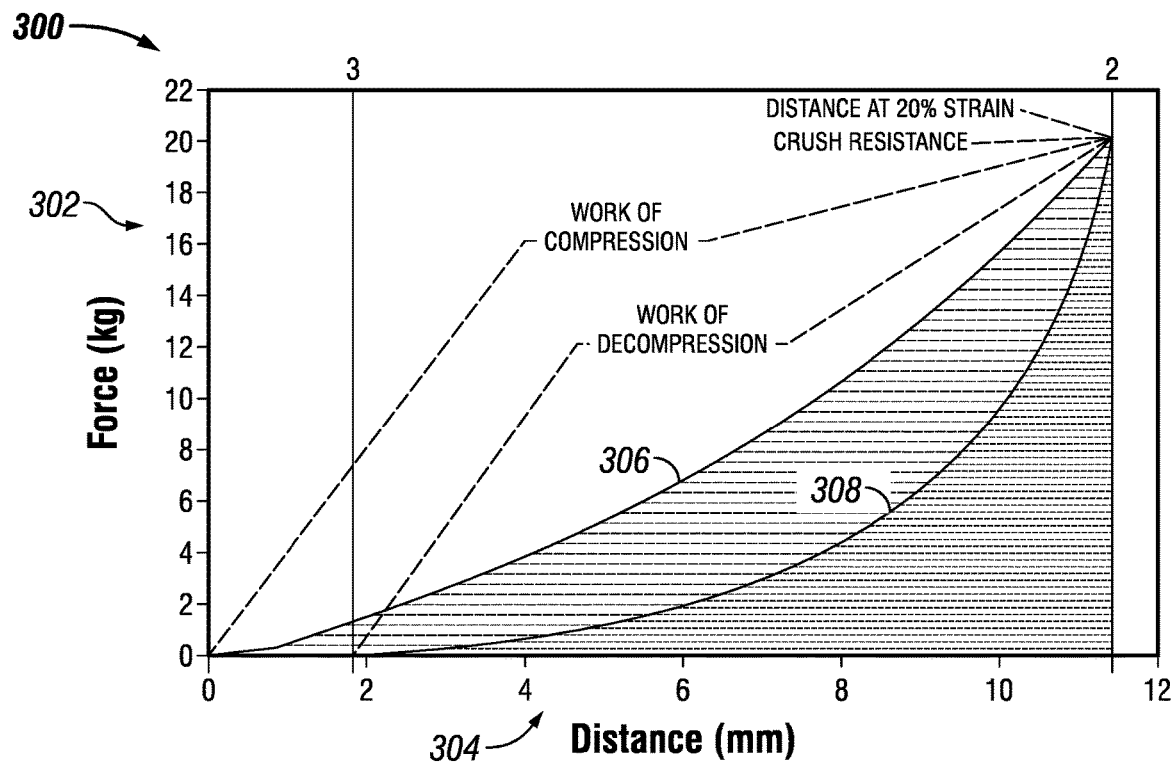
FIGS. 3 and 4 are graphs of the results of resilience tests of example flakes formed from waste vehicle tires in accordance with an embodiment of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As a wellbore is drilled, a drilling fluid is continuously pumped into the wellbore to clear and clean the wellbore and the filings. The drilling fluid is pumped from a mud pit into the wellbore and returns again to the surface. A lost circulation zone is encountered when the flow rate of the drilling fluid that returns to the surface is less than the flow rate of the drilling fluid pumped into the wellbore. It is this reduction or absence of returning drilling fluid that is referred to as lost circulation.

Embodiments of the disclosure include a LCM having flakes formed from spent vehicle tires to mitigate or prevent lost circulation in a well and minimize or prevent the loss of whole mud. As used herein, the term "spent vehicle tire" refers to a vehicle tire that has reached the end of its operational life and is no longer in use. Such tires may also be referred to as "waste vehicle tires" or "used vehicle tires." As described in the disclosure, the flakes may be produced from waste vehicle tires processed to remove steel components of the tires and produce flakes having a specific size. The waste vehicle tires may include car tires, truck tires, or tires from other types of vehicles. In some embodiments, the LCM may only include flakes formed waste vehicle tires without any other components.

Advantageously, the LCM having flakes formed from spent vehicle tires may have relatively large deformation and resiliency characteristics as compared to existing flake LCMs that are non-resilient or have relatively small deformation characteristics in downhole conditions. Thus, the LCM having flakes formed from spent vehicle tires may easily deform and fit into the loss zone in-situ under downhole pressures but can return to a larger size and shape when the in-situ pressure changes.

The flakes are produced from waste vehicle tires according to the process described in the disclosure to enable the production of flakes having the desired long axis and short axis dimensions and a specific coefficient of resiliency. In some embodiments, the flakes may have a long axis (that is, length) of 7 mm to 10 mm, a short axis (that is, width) of 5 to 7 mm, and a thickness of 3 mm to 4 mm. In some embodiments, the flakes of the LCM have a coefficient of resilience in the range of 0.49 to 0.53.

In some embodiments, the LCM having the flakes from waste vehicle tires may be added to drilling fluid to form an altered drilling fluid having the LCM. In some embodiments, the LCM may have a concentration of 10 pounds-per-barrel (ppb) to 50 ppb in the altered drilling fluid. The concentration of the LCM may be increased to address more severe lost circulation. The drilling fluid may include a water-based or oil-based drilling fluid (also referred to as a "drilling mud"). For example, suitable drilling fluids may be water-based, sea water-based, salt water-based, diesel oil-based, mineral oil-based and synthetic oil-based drilling muds. For example, in some embodiments, the drilling fluid may be a bentonite mud that includes freshwater, bentonite, caustic soda (NaOH), and soda ash ($Na_2CO_3$). In some embodiments, the drilling fluid may be a KCl-polymer mud that includes potassium chloride (KCl), polyanionic cellulose, caustic soda, soda ash, xanthan gum, bentonite and weighting agents (for example, calcium carbonate, barite, or combinations thereof). In some embodiments, the drilling fluid may be a NaCl-polymer mud that includes sodium chloride (NaCl), polyanionic cellulose, caustic soda, soda ash, xanthan gum, bentonite and weighting agents (for example, calcium carbonate, barite, or combinations thereof)

In some embodiments, the flakes may be untreated flakes. As used in the disclosure, the term "untreated" or "without treating" refers to not treated with alkali or acid, not bleached, not chemically altered, not oxidized, and without any extraction or reaction process other than possibly drying of water and mechanical processing. The term "untreated" or "without treatments" does not encompass grinding or heating to remove moisture but does encompass chemical or other processes that may change the characteristics or properties of the flakes. In such embodiments, the flakes may be manufactured without treating before, during, or after cleaning, shredding, cutting, or any other processing.

FIG. 1 depicts a process 100 for the manufacture and use of an LCM having flakes formed from waste vehicle tires in accordance with an example embodiment of the disclosure. As also shown in FIG. 1, waste vehicle tires may be obtained (block 102). The waste vehicle tires may be cleaned (block 104), such as by a high pressure air jet, to remove dirt, dust, and other foreign substances.

Next, the cleaned waste vehicle tires may be shredded into pieces having sizes of about 50 mm to about 75 mm to strip steel and other any other metals from the tire matrix (block 106). In some embodiments, the steel and other metals may be additionally removed via a magnetic separator. Next, the pieces of the waste vehicle tires may be sliced into strips (block 108) having a thickness of about 3 mm to about 4 mm and a width of about 5 mm to about 7 mm.

The strips may then be further processed to produce flakes (block 110) having a long axis (for example, length) of about 7 mm to about 10 mm, a short axis (for example, width) of about 5 mm to about 7 mm, and a thickness of about 3 mm to about 4 mm. For example, the strips may be cut or otherwise processed into flakes having a specific long axis length, short axis length, and thickness. FIG. 2 is a two-dimensional depiction of an example flake 200 according to an embodiment of the disclosure. As shown in FIG. 2, the flake 200 may have a long axis 202 and a short axis 204. As discussed in the disclosure, in some embodiments, the long axis is about 7 mm to about 10 mm and the short axis is about 3 mm to about 4 mm. It should be appreciate that the shape depicted in FIG. 2 is an example and that embodiments of the flakes described in the disclosure may have a different shapes, number of edges, etc., than that depicted in FIG. 2.

In some embodiments, the flakes may then be sorted and packed into containers (block 112) for transportation and use. In some embodiments, a suitable amount of the mix may then be transported to an oil and gas operations site for use as an LCM.

The LCM flakes may be added directly to a drilling fluid (block 114), such as a drilling mud, to create an altered drilling fluid having the waste vehicle tire flakes. For example, in some embodiments, the waste vehicle tire flake LCM may be added to (for example, blended with) a water-based drilling mud. In some embodiments, the drilling fluid may be a bentonite mud having freshwater, bentonite, caustic soda (NaOH), and soda ash ($Na_2CO_3$). In some embodiments, the waste vehicle tire flake LCM may be added at the mud pit of a mud system. After addition of the waste vehicle tire flake LCM to a drilling fluid, the altered drilling fluid may be circulated at a pump rate effective to position the drilling fluid into contact with a lost circulation zone in a wellbore, such that the waste vehicle tire flake LCM alters the lost circulation zone (for example, by entering and blocking porous and permeable paths, cracks, and fractures in a formation in the lost circulation zone). The waste vehicle tire flake LCM may form structures (for example, a plug or seal) in the paths, cracks, and fractures or openings thereof in a lost circulation zone to reduce the rate of lost circulation, thus reducing the loss of drilling mud (that is, whole mud) in the lost circulation zone. The waste vehicle tire flake LCM may provide improved seal and plug stability and form seals and plugs that are adaptable under changing subsurface conditions.

In some embodiments, the waste vehicle tire flake LCM may be mixed with a carrier fluid, a viscosifier, or both. In some embodiments, a waste vehicle tire flake LCM homogenous suspension or pill may be formed. For example, a specific carrier fluid, viscosifier, or combination thereof may be selected to form a homogenous suspension or pill having the waste vehicle tire flake LCM. The homogenous suspension or pill may be added to a drilling fluid and used in the manner similar to the waste vehicle tire flake LCM described in the disclosure.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting example of a LCM having flakes from waste vehicle tires were prepared and tested to determine the resiliency of the flakes.

The flakes from waste vehicle tires for the LCM were prepared according to the following process:
1. The waste vehicle tires were cleaned using a relatively high pressure air jet;
2. The cleaned waste vehicle tires were shredded into pieces of 50 mm to 75 mm in size, and the steel was stripped from the tire matrix;
3. The vehicle tire pieces were then sliced into strips having a thickness of 3 mm to 4 mm and a width of 5 mm to 7 mm.
4. Flakes having a long axis (that is, length) of 7 mm to 10 mm and a short axis (that is, width) of 5 to 7 mm.

A resiliency test was also conducted on the example flakes prepared according to the described process. 50 grams of the flakes were used to determine a coefficient of resiliency. The sample were subjected to strain percentages of 20% and 30% to determine compression and decompression curves. The absorbed and desorbed strain energy were calculated based on the areas below the compression and decompression curves. FIG. 3 depicts graph 300 of the results of a resilience test of the example flakes at 20% strain. As shown in FIG. 3, the y-axis 302 depicts force (in kgf) and the x-axis 304 depicts distance (in mm). The graph 300 illustrates a compression curve 306 measured during a compression cycle of the resilience test and a decompression curve 308 measured during a decompression cycle of the test. As will be appreciated, the areas below the compression curve 306 and the decompression curve 308 may be used to determine a coefficient of resilience (COR) according to Equation 1:

$$COR = \frac{Ad}{Ac} \quad (1)$$

Where COR is the coefficient of resilience, Ad is the area under the decompression curve, and Ac is the area under the compression curve.

Figure 4:
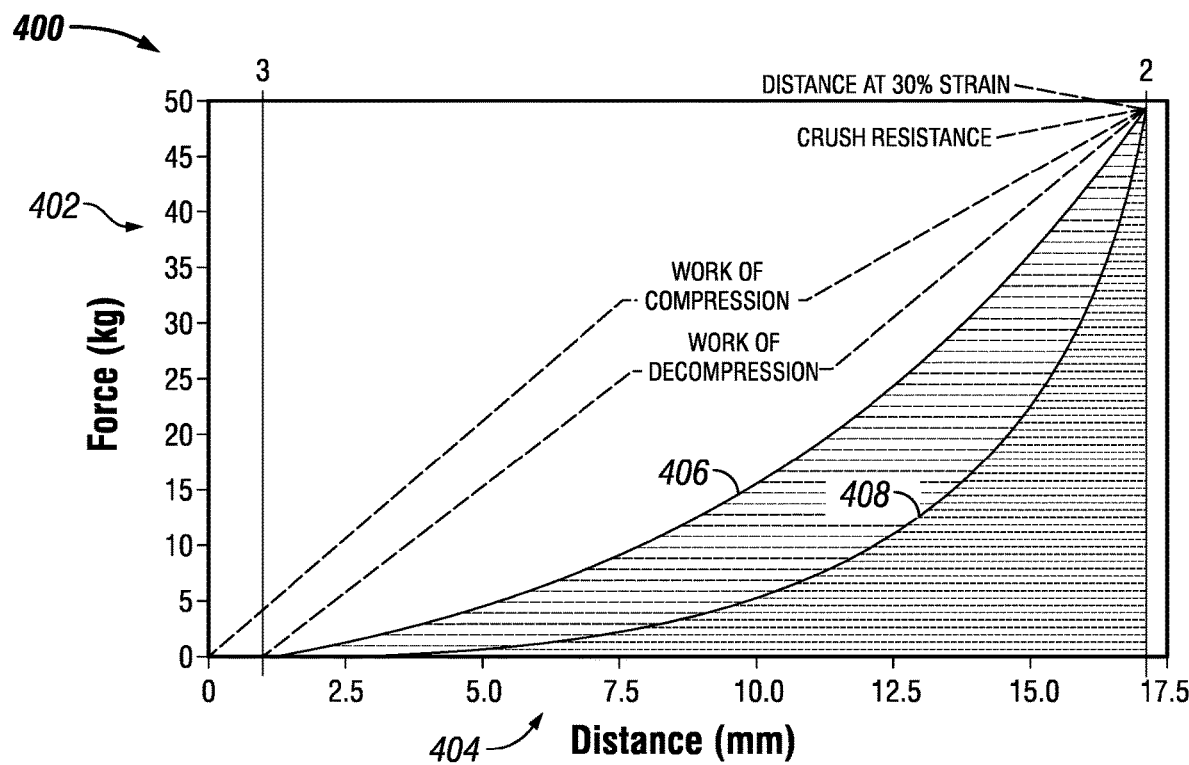

FIG. 4 depicts graph 400 of the results of a resilience test of the example flakes at 30% strain. As shown in FIG. 4, the y-axis 402 depicts force (in kgf) and the x-axis 404 depicts distance (in mm). The graph 400 also illustrates a compression curve 406 measured during a compression cycle of the resilience test and a decompression curve 408 measured during a decompression cycle of the test.

Table 1 shows the results of the resiliency test for the example flakes as expressed by the coefficient of resilience calculated from the measurements shown in FIGS. 3 and 4, with the compressive load measured in kilograms-force (kgf), the distance at max strain % measured in mm, and the compression work and decompression work under the load-displacement curves of FIGS. 3 and 4 in kgf·mm:

TABLE 1

RESILIENCY TEST RESULTS FOR EXAMPLE FLAKES
FORMED FROM WASTE VEHICLE TIRES

| Test Conditions | Compressive Load (kgf) | Distance at max strain (mm) | Work of Compression (kgf · mm) | Work of Decompression (kgf · mm) | Coefficient of Resiliency (COF) |
|---|---|---|---|---|---|
| 20% Strain | 20.18 | 11.43 | 85.35 | 42.10 | 0.49 |
| 30% Strain | 49.56 | 17.12 | 272.70 | 143.5 | 0.53 |

Table 1 shows that at 20% strain the example flakes exhibited a coefficient of resiliency of 0.49, indicating that nearly 50% of the original shape and size of the flakes was recovered when the load was withdrawn during the decompression phase of the test. Table 1 also shows that at 30% strain the example flakes exhibited a coefficient of resiliency of 0.53, indicating that more than 50% of the original shape and size of the flakes was recovered when the load was withdrawn during the decompression phase of the test. These results show that a LCM having the flakes will provide suitable adaptation characteristics to seal, plug, or both a lost circulation zone under the changing load conditions of a borehole environment.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A lost circulation material (LCM) composition, the composition comprising:
    a plurality of flakes produced from vehicle tires, wherein each of the plurality of flakes has a long axis of 7 millimeter (mm) to 10 mm, a short axis of 5 mm to 7 mm, and a thickness of 3 mm to 4 mm, wherein the LCM has a concentration of 10 pounds-per-barrel (ppb) to 50 ppb in a drilling fluid.

2. The LCM composition of claim 1, wherein the LCM consists of the plurality of flakes produced from vehicle tires.

3. The LCM composition of claim 1, wherein the plurality of flakes produced from vehicle tires comprises a plurality of untreated flakes.

4. The LCM composition of claim 1, wherein the plurality of flakes are produced by:
    shredding the vehicle tires into a plurality of pieces, the shredding including removing steel from the vehicle tires;
    cutting each of the plurality of pieces into a plurality of strips; and
    cutting each of the plurality of strips into a plurality of flakes.

5. A method to prevent lost circulation of a drilling fluid in a wellbore, comprising:
    introducing an altered drilling fluid into the wellbore such that the altered drilling fluid contacts a lost circulation zone and reduces a rate of lost circulation into the lost circulation zone, wherein the altered drilling fluid comprises a drilling fluid and a lost circulation material (LCM), wherein the LCM comprises a plurality of flakes produced from a vehicle tire wherein each of the plurality of flakes has a long axis of 7 millimeter (mm) to 10 mm, a short axis of 5 mm to 7 mm, and a thickness of 3 mm to 4 mm, wherein the LCM has a concentration of 10 pounds-per-barrel (ppb) to 50 ppb in the altered drilling fluid.

6. The method of claim 5, wherein the altered drilling fluid consists of the drilling fluid and the LCM.

7. The method of claim 5, wherein the LCM consists of the plurality of flakes produced from the vehicle tire.

8. The method of claim 5, wherein the plurality of flakes produced from the vehicle tire comprises a plurality of untreated flakes.

9. The method of claim 5, wherein the plurality of flakes have a coefficient of resiliency of 0.49 to 0.53.

10. The method of claim 5, wherein the flakes are produced by:
    shredding the vehicle tire into a plurality of pieces, the shredding including removing steel from the vehicle tire;
    cutting each of the plurality of pieces into a plurality of strips; and
    cutting each of the plurality of strips into a plurality of flakes.

11. An altered drilling fluid, comprising:
    a drilling fluid; and
    a lost circulation material (LCM), wherein the LCM comprises a plurality of flakes produced from a vehicle tire, wherein each of the plurality of flakes has a long axis of 7 millimeter (mm) to 10 mm, a short axis of 5 mm to 7 mm, and a thickness of 3 mm to 4 mm, wherein the LCM has a concentration of 10 pounds-per-barrel (ppb) to 50 ppb in the altered drilling fluid.

12. The altered drilling fluid of claim 11, wherein the LCM consists of the plurality of flakes produced from the vehicle tire.

13. The altered drilling fluid of claim 11, wherein the plurality of flakes produced from the vehicle tire comprises a plurality of untreated flakes.

14. The altered drilling fluid of claim 11, wherein the plurality of flakes have a coefficient of resiliency of 0.49 to 0.53.

15. The altered drilling fluid of claim 11, wherein the plurality of flakes are produced by:
    shredding the vehicle tire into a plurality of pieces, the shredding including removing steel from the vehicle tire;
    cutting each of the plurality of pieces into a plurality of strips; and
    cutting each of the plurality of strips into a plurality of flakes.

16. A method of manufacturing a lost circulation material (LCM), comprising:
    obtaining a vehicle tire;
    shredding the vehicle tire into a plurality of pieces, the shredding including removing steel from the vehicle tire, each of the plurality of pieces having a size of 50 mm to 75 mm;
    cutting each of the plurality of pieces into a plurality of strips, each of the plurality of strips having a thickness off 3 mm to 4 mm and a width of 5 mm to 7 mm; and
    cutting each of the plurality of strips into a plurality of flakes, each of the plurality of flakes having a long axis of 7 millimeter (mm) to 10 mm and a short axis of 5 mm to 7 mm, wherein the LCM has a concentration of 10 pounds-per-barrel (ppb) to 50 ppb in a drilling fluid..

17. The method of claim 16, comprising cleaning the vehicle tire using an air jet before shredding the vehicle tire.

* * * * *

UNITED STATES PATENT AND TRADEMARK OFFICE
CERTIFICATE OF CORRECTION

PATENT NO. : 11,613,943 B2
APPLICATION NO. : 17/212730
DATED : March 28, 2023
INVENTOR(S) : Al-Ansari et al.

It is certified that error appears in the above-identified patent and that said Letters Patent is hereby corrected as shown below:

In the Claims

Column 8, Claim 16, Line 52 should read:
-- of 3 mm to 4 mm and a width of 5 mm to 7 mm; and --

Signed and Sealed this
Twenty-fourth Day of October, 2023

Katherine Kelly Vidal
*Director of the United States Patent and Trademark Office*